(12) United States Patent
Woolthuis et al.

(10) Patent No.: US 11,647,868 B2
(45) Date of Patent: May 16, 2023

(54) DEVICE FOR CARRYING A BEAKER AND CLAMPINGLY POSITIONING A HEAT TRANSFER SHEET AROUND THE BEAKER

(71) Applicant: BKW HOLDING B.V., Baarn (NL)

(72) Inventors: Bonne Klein Woolthuis, Baarn (NL); Harmen Klein Woolthuis, Baarn (NL)

( * ) Notice: Subject to any disclaimer, the term of this patent is extended or adjusted under 35 U.S.C. 154(b) by 57 days.

(21) Appl. No.: 16/482,329

(22) PCT Filed: Jan. 31, 2018

(86) PCT No.: PCT/NL2018/050070
§ 371 (c)(1),
(2) Date: Jul. 31, 2019

(87) PCT Pub. No.: WO2018/143804
PCT Pub. Date: Aug. 9, 2018

(65) Prior Publication Data
US 2019/0357730 A1 Nov. 28, 2019

(30) Foreign Application Priority Data

Feb. 1, 2017 (NL) .................................... 2018282

(51) Int. Cl.
*A47J 45/00* (2006.01)
*B41F 16/00* (2006.01)
(Continued)

(52) U.S. Cl.
CPC ........... *A47J 45/00* (2013.01); *B41F 16/0086* (2013.01); *B41M 5/03* (2013.01); *B44C 1/1725* (2013.01)

(58) Field of Classification Search
CPC ..... A47J 45/00; B41F 16/008; B41F 16/0086; B41F 16/00; B41M 5/03; B41M 5/0358;
(Continued)

(56) References Cited

U.S. PATENT DOCUMENTS 5,318,942 A * 6/1994 Laudy .................. B41M 5/0358
503/227
5,802,969 A * 9/1998 Wess .................... B41M 5/0358
156/240
(Continued)

FOREIGN PATENT DOCUMENTS

CN 105342297 A * 2/2016
WO WO-2018143804 A1 * 8/2018 .............. A47J 45/00

OTHER PUBLICATIONS

English translation of the claims of CN 105342297.*
English translation of the description of CN 105342297.*
EIC Search (Year: 2023).*

*Primary Examiner* — Sonya M Sengupta
(74) *Attorney, Agent, or Firm* — Wilcox & Myers, P.C.; Jeffrey D. Myers (57) ABSTRACT

The invention relates to a device for carrying a substrate, for example a drinking cup, and clamping against the substrate, for example against an outer wall of the drinking cup, a clamping sheet, wherein the clamping sheet comprises a flexible and bendable material with a width and a length, said length being measured between longitudinal ends of the clamping sheet, wherein coupling members are provided at longitudinal ends of the clamping sheet, said coupling members comprising rods protruding in the width direction of the clamping sheet. The device is characterized in that the device comprises first recesses for receiving rods of a first width side that are positioned at opposite longitudinal ends of the clamping sheet and comprises second recesses for receiving rods of a second width side that are positioned at opposite longitudinal ends of the clamping sheet, and the device comprises a support member for carrying the device and the substrate.

13 Claims, 5 Drawing Sheets

(51) Int. Cl.
*B41M 5/03* (2006.01)
*B44C 1/17* (2006.01)

(58) Field of Classification Search
CPC . B44C 1/1712; B44C 1/1725; B41P 2219/31; B41P 2219/43; H05B 1/00; H05B 1/0227; B41J 3/40731; B41J 3/40733; F24H 9/18
See application file for complete search history.

(56) References Cited

U.S. PATENT DOCUMENTS

| | | | | |
|---|---|---|---|---|
| 5,876,547 | A | * | 3/1999 | Kiesow ............... B41F 16/0086 156/215 |
| 5,944,931 | A | * | 8/1999 | Cranford ............ B41F 16/0086 156/247 |
| 7,329,631 | B1 | | 2/2008 | Burnett |
| 8,684,430 | B1 | | 4/2014 | Brandon |
| 11,407,245 | B1 | * | 8/2022 | Dalton ................ B41F 16/0086 |
| 2006/0283555 | A1 | * | 12/2006 | Green ................... B44C 1/1712 156/359 |
| 2019/0357730 | A1 | * | 11/2019 | Woolthuis ............. B44C 1/1712 |
| 2022/0032672 | A1 | * | 2/2022 | Peng ................... B41J 3/40733 |

\* cited by examiner

DEVICE FOR CARRYING A BEAKER AND CLAMPINGLY POSITIONING A HEAT TRANSFER SHEET AROUND THE BEAKER

The present invention relates to a device according to the preamble of claim 1. This device can be used for carrying a substrate and clamping a heat transfer sheet tight against the outer surface of the substrate, for example a drinking cup. By heating the heat transfer sheet and the substrate to a predetermined temperature, the ink or toner present on the heat transfer sheet will be transferred onto the substrate and penetrate into a receiving layer provided on the said substrate. Such heat transfer sheet is commonly known and has an ink or toner that is suitable for this purpose. Hereafter, reference will be made to ink, although the invention is not limited to that. Every suitable coloring material is meant by the term "ink", including for example toner. Applying this technique, a very good ink transfer can be obtained from the heat transfer sheet to the substrate. The invention also relates to a method for clampingly holding against the substrate a heat transfer sheet using of the device according to the present invention.

Hereafter, reference will generally be made to a mug, where, however, also and without any limitation, any other embodiment of a substrate is meant. In particular, the invention relates to substrates having a cylindrical or conical shape and around which the clamping sheet can be placed tightly.

A device as mentioned above is known in the art. For example, devices are known like MPress, HPN and Technotape (amongst which the Module Mug Press) that keep a mug clamped within a preformed cylindrical recess and that feed heat from a heating jacket integrated in the device. A heat transfer sheet is positioned in between the mug and the clamping sheet. A disadvantage of these known devices is the preformed recess to receive a mug. A suitable clamping is obtained only when the recess exactly follows the shape of the mug when clamping same. In order to obtain a uniform pressure across the entire surface of the mug, the wall of the recess is provided with a compressible material, often a rubber. In order to be able to place the mug in the recess, the diameter of the wall of the recess will have to be larger than the outside diameter of the mug. This automatically means that during the step of clamping the wall of the recess against the mug, a large shearing force is applied to the mug. Therefore, the heat transfer sheet which is located between the mug and the wall of the recess will also slide over the mug. The final positioning of the heat transfer sheet is therefore uncertain. Furthermore, there is the risk that due to the heat already present in the heating jacket of the device when the wall is being clamped around the mug, ink is transferred to the mug before the desired degree of clamping of the heat transfer sheet is reached. The final image will therefore become blurred. Another disadvantage of these known devices is that the heat supply of the heating element in the heating jacket is poor, since the wall of the device is often a thick (up to one centimeter thick) compressible material which inherently poorly conducts heat. Yet another disadvantage is the limited shape equality between the wall of the recess and the mug; the material of the wall must have a relatively great rigidity in order to be able to develop sufficient contact pressure, as a result of which the wall of the recess will not provide optimal clamping after clamping, which will lead to degassing taking place, as well as the spread of ink over the mug.

All in all, this leads to a large dropout of mugs.

An alternative form of an apparatus for transferring an image of a heat transfer sheet onto a mug comprises a steel clamping device comprising a rubber clamping member carried within a steel frame surrounding the entire mug. The steel frame is fed around the mug with some force to press and hold the clamping member against the surface of the mug. The heat transfer sheet is held clamped between the rubber and the outer surface of the mug. Such a construction is intended to pass the thus clamped cup through an oven, as is the case in industrial applications. After a sufficient time at high temperature has been spent in the oven, the ink is transferred to the mug and the device is removed from the mug A drawback of this known device is that both the steel frame and the rubber clamping element absorb a great deal of heat at every cycle that is spent in the oven. The latter only means energy loss because that energy is not spent efficiently. Also, the device must first cool down before it can be removed from the substrate. Also, the residence time in the oven is long because a part of the energy is used for heating the device and not for heating up the substrate and the heat transfer sheet. Energy consumption and time are therefore adversely affected by use of this known device.

These known devices therefore need improvement in order to eliminate at least one of the aforementioned disadvantages.

In particular, there is a need for an improved device for clamping a heat transfer sheet around a substrate, for example a mug, whereby a certain positioning is obtained and a chance of premature transfer of colors is prevented.

There is also a need for an improved device in which the clamping of a heat transfer sheet against the outer surface of the mug takes place quickly and safely.

There is also a need for an improved device that can be easily used in an industrial application.

No device or method is known in the art with which the abovementioned disadvantages can be eliminated.

The object of the invention is therefore to provide an improved device of the type mentioned in the preamble which can provide at least one of the aforementioned needs.

In particular, it is the object of the invention to provide a device of the type mentioned in the preamble which can in a simple and secure manner clamp a heat transfer sheet around a substrate, for instance a mug or drinking cup.

In particular, it is the object of the invention to provide a device which can clamp both the heat transfer sheet around the substrate and carry or support the substrate during the heat treatment.

The invention also aims to provide a device which absorbs substantially no or only very little heat, so that a heat to be supplied by a heating device is mainly used only for heating up the substrate and substantially not for heating up the device.

According to a further embodiment, the object of the invention is to provide a method for clamping the transfer sheet against a substrate and which, moreover, can carry the substrate during the heat treatment.

Another object of the invention is to provide a method for transferring an image from a heat transfer sheet onto a substrate.

In order to obtain at least one of the aforementioned advantages, the invention according to a first embodiment provides a device containing the features of claim 1. This device has the advantage that a heat transfer sheet can be clamped very easily, tightly and securely around a substrate while the substrate is carried simply and effectively so that optimum heat supply to the substrate is ensured.

It has also been found that the device according to the invention can be manufactured with very little material. For example, the device can be made of plastic. The heat content is therefore very small, so that heat absorption by the device during the heat transfer process is virtually nil. Such a synergistic effect is completely unexpected.

The invention therefore according to a first embodiment relates to a device for carrying a substrate, for example against an outer wall of the drinking cup, a clamping sheet, wherein the clamping sheet comprises a flexible and bendable material with a width and a length, said length being measured between longitudinal ends of the clamping sheet, wherein coupling members are provided at longitudinal ends of the clamping sheet, said coupling members comprising rods protruding in the width direction of the clamping sheet. The device is characterized in that the device comprises first recesses for receiving rods of a first width side that are positioned at opposite longitudinal ends of the clamping sheet and comprises second recesses for receiving rods of a second width side that are positioned at opposite longitudinal ends of the clamping sheet, and the device comprises a support member for carrying the device and the substrate.

The invention makes it possible to use a very simple coupling method to keep the clamping sheet around the substrate. For this purpose, the device can be placed around the protruding projecting rods of the coupling member located adjacent to each other, so that the rods cannot move away from each other. By stretching the clamping sheet slightly and clamping the rods in the device, the clamping sheet will be effectively held around the substrate. The device is then arranged around two projecting rods projecting on the same width side of the clamping sheet and being positioned at the two opposite longitudinal ends of the clamping sheet. The device therefore comprises recesses which are arranged to hold rods of the same width side positioned at opposite ends of the clamping sheet while positioning the clamping sheet around the sub-street.

Therefore, it is particularly preferred that the apparatus is adapted for mutually coupling, in recesses on a first side, rods of a first width side positioned at opposite longitudinal ends of the clamping sheet and mutually coupling, in recesses on a second side, rods of a second width side positioned at opposite longitudinal ends of the clamping sheet. If the substrate contains a holding member, for example an ear of a mug, the holding member will be situated between the longitudinal ends of the clamping sheet, the device extending on either side of the holding member, for instance near a top and a bottom side of a mug respectively. The invention therefore also relates to a device wherein at a position between the first recesses and the second recesses an opening is provided for receiving therein a retaining or holding member of the substrate, for instance an ear of a drinking cup.

An efficient embodiment is obtained when the opening for receiving the retaining or holding member of the substrate forms a material part removed from the device.

An efficient device can be obtained when the opening is located at a position between the support member and the recesses. The device can then be manufactured using a small amount of material, which results in a small amount of material use and therefore little heat absorption. This increases the efficiency of the transfer process.

It is especially preferred that said recesses for receiving the ends of the rods of the clamping sheet during use of the apparatus are provided substantially uniformly distributed with respect to the supporting members of the device. This provides a stable equilibrium to the device when placed on a surface supporting the device and the substrate, and as a consequence the risk of falling over is low and optimum heat supply can be guaranteed. This also has the advantage that damage in the images during the heat transfer process is minimized.

In particular, it is preferable that the length of the clamping sheet in the stretched state during use is less than the circumference of the substrate to be clamped in the device, in particular less than the length over the circumference of the substrate between the one side of the ear to the other side of the ear if a substrate with a holding member is used. As a result, a degree of stretching can be ensured at all times by stretching the clamping sheet slightly while a retaining member of the substrate remains free, which guarantees an optimal clamping of the heat transfer sheet against the substrate.

A particularly advantageous embodiment of the clamping sheet is obtained when the clamping sheet comprises a silicone rubber. Such a material is well resistant to high temperatures and temperature changes, which guarantees a long life. Also silicone rubber in small thicknesses can be produced sufficiently strong and resilient, thus guaranteeing a certain application of the heat transfer sheet against the substrate.

In the device according to the invention, the rods are shaped integrally with the clamping sheet. Preferably, the rods are embedded in the clamping sheet's material over the width of the clamping sheet, providing an excellent coupling.

According to a further aspect, the invention relates to a method for clamping against a substrate, for example a mug, a heat transfer sheet by means of a device according to the invention. The method comprises the steps of:—positioning a heat transfer sheet around the substrate with a layer of ink to be transferred directed towards the substrate;—positioning over the heat transfer sheet a flexible and stretchable clamping sheet having a width and a length situated between longitudinal ends of the clamping sheet, wherein coupling members are provided at the longitudinal ends of the clamping sheet, which coupling members comprise rods projecting in the width direction of the clamping sheet, and wherein the width of the clamping sheet is directed in a height direction of the substrate;—stretching the clamping sheet around the substrate and moving the coupling members towards each other; and—interconnecting the coupling members. The method is characterized in that the coupling is performed by means of a device comprising first recesses for accommodating rods of a first width side positioned on opposite longitudinal ends of the clamping sheet and comprising second recesses for accommodating rods of a second width side positioned on opposite longitudinal ends of the clamping sheet, and which also comprises a support member for carrying the device and the substrate, and the method further comprises supporting the device. This method provides the advantages as indicated above with reference to the device according to the invention. By using the aforementioned preferred embodiments of the device described above, the same advantages are obtained in this method.

The clamping sheet is placed around almost the entire outer surface of the substrate with a cylindrical or cone-shaped substrate. The rods at the ends will here be positioned at some distance from each other and have to be moved with force against each other against the stretching force of the material. As a result, the clamping sheet will lie tightly around the substrate. With sufficient stretching, the clamping sheet lies tightly over the heat transfer sheet and clamps that sheet tightly against the outer surface of the substrate, after which the rods are coupled by the device and the parts will be mutually coupled.

An especially preferred embodiment of the method according to the present invention comprises the step of:— placing rods of a first width side that are positioned at opposite longitudinal ends of the clamping sheet near a bottom side of the substrate and placing rods of a second width side that are positioned at opposite longitudinal ends of the clamping sheet near a top side of the substrate, clamping the clamping sheet around at least a part of the circumference of the substrate, and mutually coupling rods of a same width side that are positioned at opposite longitudinal ends of the clamping sheet by means of the first and second, respectively, recesses in the device. This is advantageous, for example, when the substrate is a mug and a substantially complete clamping of the surface of the mug is obtained from the bottom side to the top side.

For transferring the ink from the heat transfer sheet to the surface of the substrate, an additional step is performed of placing the device and the substrate and the clamping sheet and the heat transfer sheet clamped around the substrate in a heating device, wherein the device supports on a bottom in the heating device.

Alternatively, the device may be suspended in a heating device, like an oven, wherein the carrying or support member is a suspension device for suspending the device and the substrate.

After sufficient heating, the method also comprises the step of disconnecting the coupling members and removing the clamping sheet and the heat transfer sheet from the substrate after heating the device and the substrate in the heating device for a predetermined time. After that, a substrate with an image is obtained. The image is a mirror image of the image on the heat transfer sheet.

The invention will be explained in more detail below with reference to a drawing. The drawing shows in.

In the figures, the same parts are indicated by the same reference numerals. However, not all parts that are necessary for a practical implementation of the invention are shown, because of the simplicity of the drawing.

Figure 1:
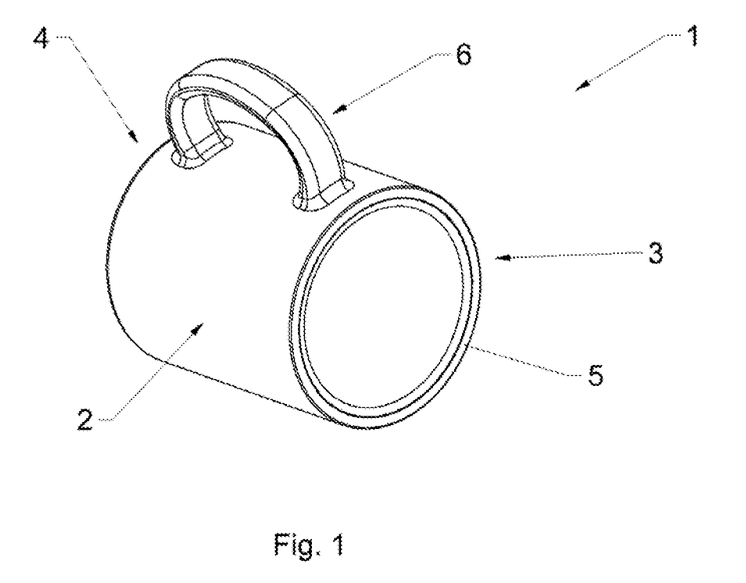
FIG. 1 a substrate for coating with an image from a heat transfer sheet using a device according to the invention, FIG. 2 a device according to the invention, FIG. 3 a combination of a substrate and a device according to the invention, FIG. 4 a holder for use with the clamping sheet according to the invention, FIG. 5 an application of the device according to the invention, and FIG. 6 the mutual clamping of rods of the clamping sheet according to the prior art.

FIG. 1 shows a substrate 1 in the form of a drinking cup or mug 1. The mug 1 has an outer surface 2 extending between an upper side 3 and a bottom side 4. A user will drink with his mouth against the edge 5 at the top 3. Between the top side 3 and the bottom side 4 an ear 6 is provided which serves as a holding member. The outer surface 2 is provided with a coating that can easily absorb an ink from a heat transfer sheet.

Figure 2:
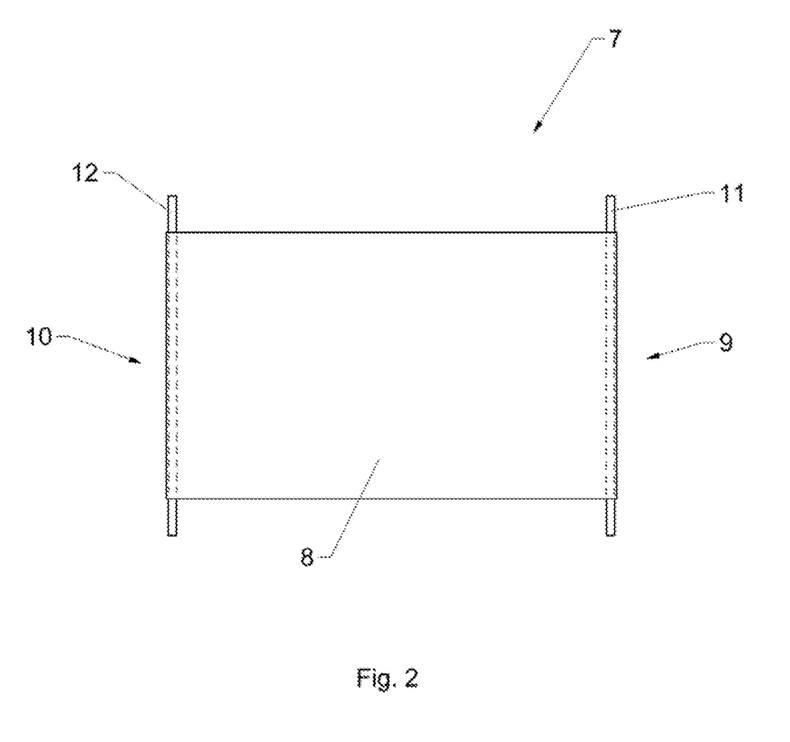

FIG. 2 is a plan view of a device 7 according to the invention, formed of a clamping sheet 8 and rods 11, 12 provided at longitudinal ends 9, 10. The longitudinal ends 9, 10 define between them in the length of the clamping sheet 8. The clamping sheet 8 has a width which extends perpendicularly to the length in the main plane of the clamping sheet 8. The rods 11, 12 are connected to the clamping sheet over the entire width and extend beyond the clamping sheet 8.

Figure 3:
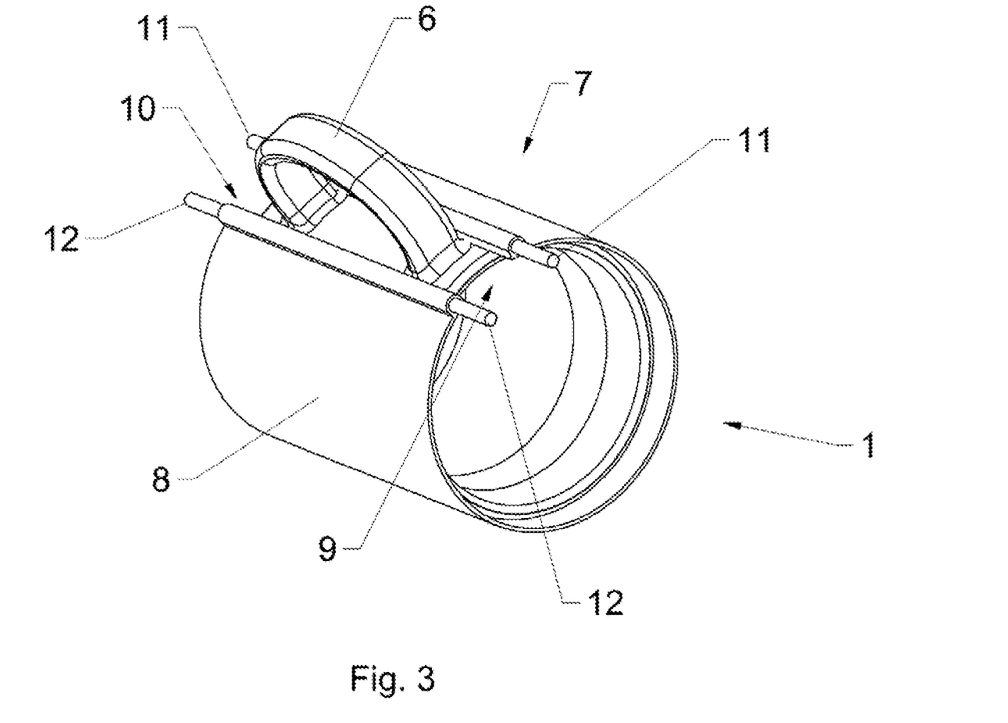

FIG. 3 shows a situation in which the clamping sheet 8 is located around the mug 1. The clamping sheet 8 lies tightly around the outer surface 2 of the mug 1. A heat transfer sheet is placed between the clamping sheet 8 and the outer surface 2 (not visible in FIG. 3), whereby an image on the heat transfer sheet is directed to the outer surface 2 and there being held tightly. The longitudinal ends 9, 10 are located on either side of the ear 6. The rods 11, 12 extend beyond the top and bottom of the mug 1.

Figure 4:
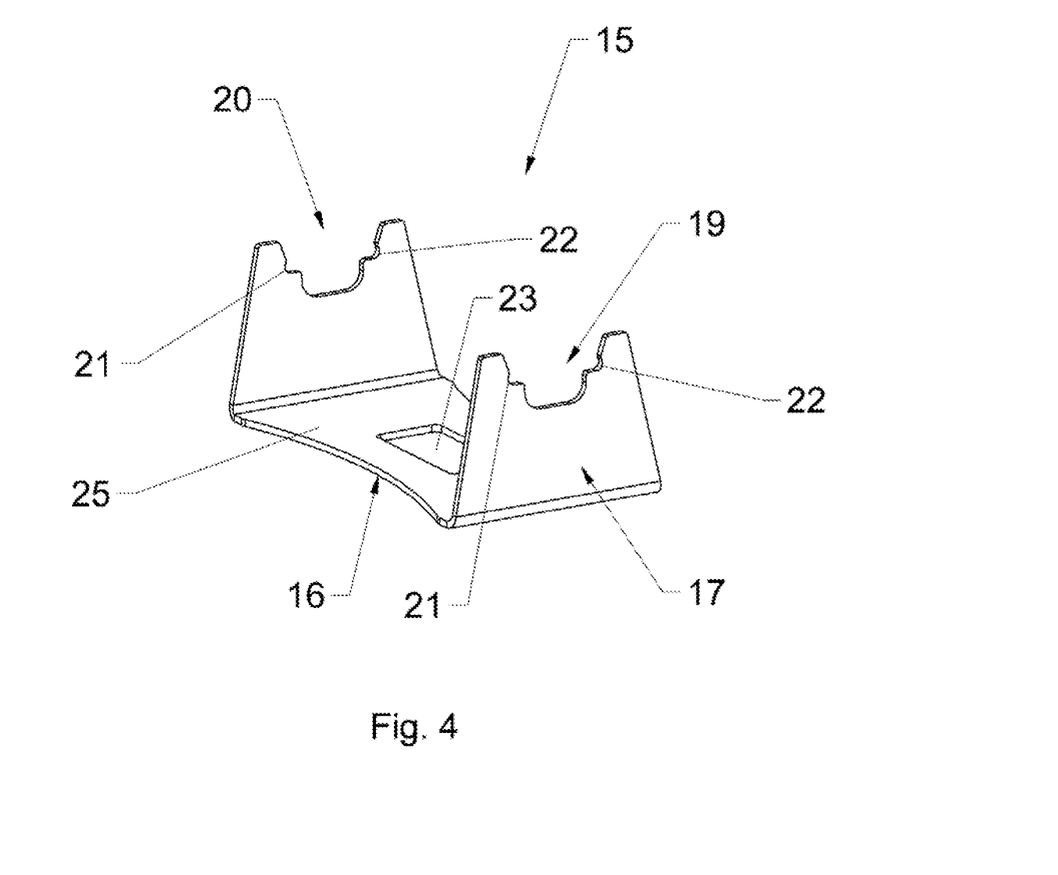
Figure 5:
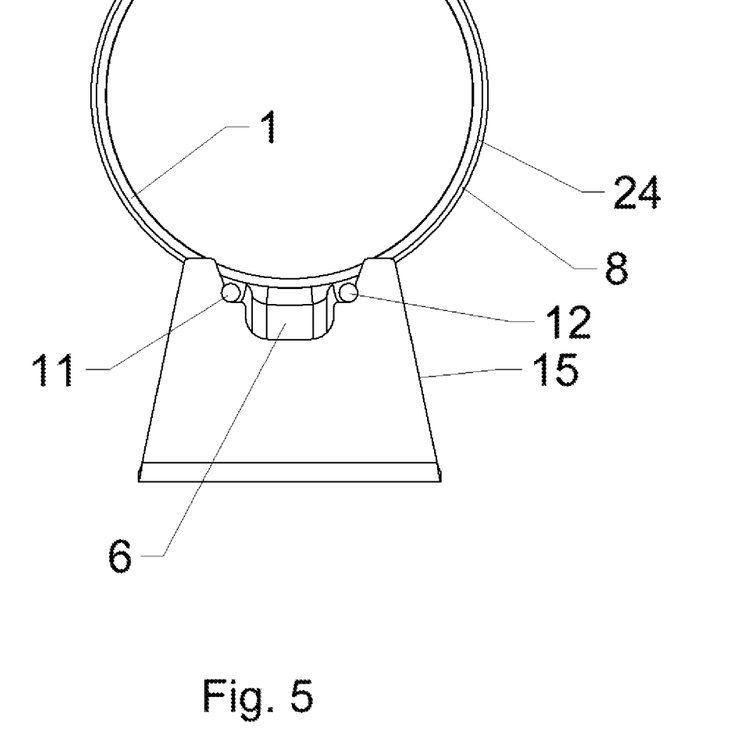

FIG. 4 shows an alternative embodiment for holding the rods 11, 12. FIG. 5 shows a holder 15. The holder comprises a frame 16 with two uprights 17, 18 placed at a distance from each other, each having a recess 19, 20 within which respective ends of the rods 11, 12 can be received. Accommodating or receiving cavities 21, 22 extending from the recess 19, 20 into the direction of the tensile force exerted by the clamping sheet 8 upon stretching, provide a fixed yet releasable coupling with the rods 11, 12.

The holder 15 comprises in the embodiment shown an opening 23 in which the ear 6 can be received. When the height of the uprights 17, 18 is sufficient, the ear can be accommodated entirely inside the holder 15 and the opening 23 is not required.

FIG. 5 shows a side view of the holder 15 in which a mug 1 (in dashed line) is received, the ear 6 of which falls within the container. Around the outer surface 2 of the mug a heat transfer sheet 24 is placed around which the clamping sheet 8 according to the invention is located.

In FIG. 5, the rods 11, 12 are coupled in the receiving cavities 21, 22. Such a coupling by means of the accommodating or receiving cavities 21, 22 in the holder 15 ensures a simple and stable coupling of the rods 11, 12 in that the two rods are simultaneously brought in the receiving cavities 21, 22 of the container 15. The assembly or combination of mug 1, heat transfer sheet 24, clamping sheet 8 and holder 15 according to the invention can undergo heat treatment in an oven.

The holder 15 can be placed in the oven and thereby be supported on the frame plate 25, or on cams or the like provided on the frame plate, so that the mug with the ear 6 points downwards. However, the holder 15 can also support with the side surface 17 or 18 on a bearing surface (for instance a bottom) of the oven, so that the opening of the mug 1 points upwards or downwards. To this end, the side surfaces 17, 18 can optionally be provided with protruding cams or the like, so that the rods 11, 12 do not touch the bearing surface of the oven. As a matter of fact, it does not have to be a problem when the assembly touches a bearing surface of the oven with ends of the rods 11, 12. To this end, the side surface 17, 18 may comprise one or more projections at a position near the frame plate 16, so that the assembly is supported by said projections and the ends of the rods 11, 12. The invention therefore provides the advantage that a mug 1 or a different type of substrate with heat transfer sheet and clamping sheet can be placed in different ways, depending on the situation where the heat absorption or the degree of occupation in an oven is optimal. The assembly or combination of mug 1, heat transfer sheet 24, clamping sheet 8 and holder 15 according to the invention can even be suspended from suitable carriers, which can be provided in an oven or in a climate control room.

Figure 6:
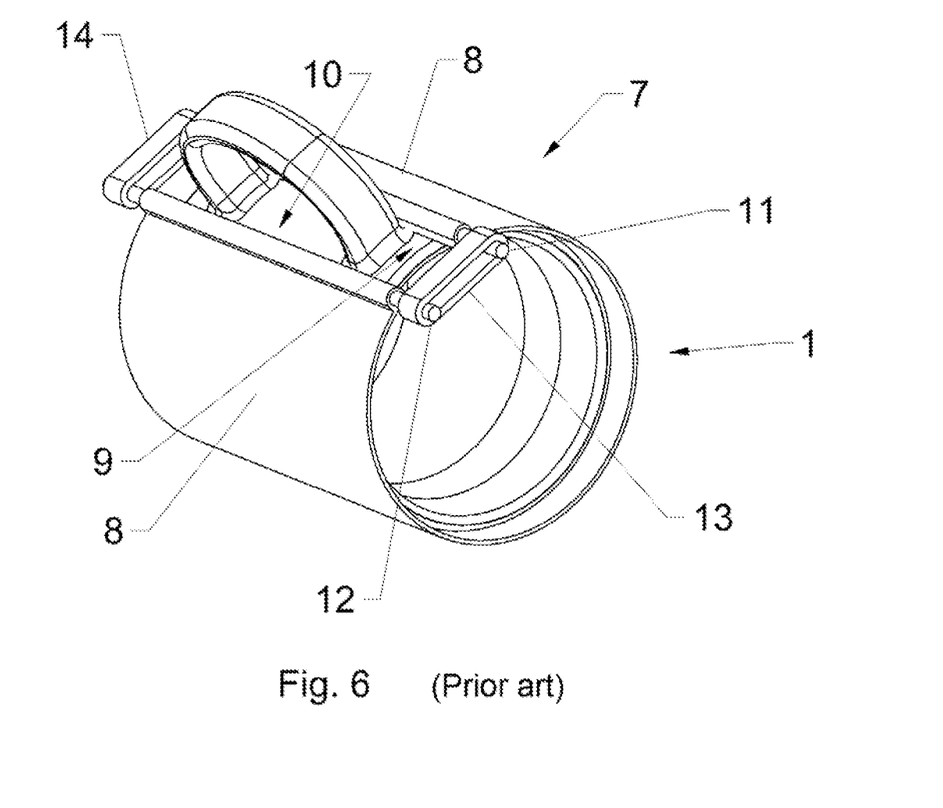

FIG. 6 shows an alternative embodiment according to the prior art, in which rings 13, 14 are placed around the rods 11, 12. On each width side of the clamping sheet 8 a ring 13; 14 is placed around a pin 11 and 12. For this purpose, the clamping sheet 8 must be slightly stretched manually, the ends 9, 10 of the clamping sheet 8 being both moved relatively in the direction of the ear 6, in order then to place the rings 13, 14 one at a time. The clamping sheet must be held in a timely manner with one hand in order to be able to place the rings one at a time. Extra attention should be paid to ensure that the heat transfer sheet is not shifted. The rings 13, 14 hold the rods 11, 12 in place and the clamping sheet 8 under tension, so that it abuts tightly against the outer surface 2 of the mug 1.

The invention is not limited to the embodiments described above and shown in the figures. The invention is only limited by the appended claims. For example, the clamping sheet may extend beyond the top edge and bottom edge of the substrate.

The invention also extends over any combination of measures which are described independently herein.

The invention claimed is:

1. A combination of a device for carrying a substrate and a clamping sheet, the device being embodied for clamping the clamping sheet against the substrate, wherein the clamping sheet comprises a flexible and bendable material with a width and a length, said length being measured between longitudinal ends of the clamping sheet, wherein coupling members are provided at longitudinal ends of the clamping sheet, said coupling members comprising rods protruding in the width direction of the clamping sheet, and wherein:
   the device comprises a support member distinct from the clamping sheet for carrying the device and the substrate; and
   the support member comprises first recesses for receiving straight rods of a first width side that are positioned at opposite longitudinal ends of the clamping sheet and comprises second recesses for receiving straight rods of a second width side that are positioned at opposite longitudinal ends of the clamping sheet.

2. The combination according to claim 1, wherein at a position between the first recesses and the second recesses an opening is provided for receiving therein a retaining member of the substrate.

3. The combination according to claim 2, wherein the opening is located at a position between the support member and the recesses.

4. The combination according to claim 1, wherein said recesses for receiving the ends of the rods of the clamping sheet during use of the apparatus are provided substantially uniformly distributed with respect to the support member of the device in order to provide a stable equilibrium to the device when placed on a surface supporting the device and the substrate.

5. The combination according to claim 1, wherein the length of the clamping sheet in stretched state during use is less than the circumference of the substrate.

6. The combination according to claim 1, wherein the clamping sheet comprises a silicone rubber.

7. The combination according to claim 1, wherein the rods are shaped integrally with the clamping sheet.

8. The combination according to claim 7, wherein the rods are shaped integrally with the clamping sheet over the width of the clamping sheet embedded in the clamping sheet's material.

9. A method for clamping against a substrate a heat transfer sheet by means of a combination according to claim 1, the method comprising the steps of:
   positioning a heat transfer sheet around the substrate with a layer of ink to be transferred directed towards the substrate;
   positioning over the heat transfer sheet a flexible and stretchable clamping sheet having a width and a length situated between longitudinal ends of the clamping sheet, wherein coupling members are provided at the longitudinal ends of the clamping sheet, which coupling members comprise straight rods projecting in the width direction of the clamping sheet, and wherein the width of the clamping sheet is directed in a height direction of the substrate;
   stretching the clamping sheet around the substrate and moving the coupling members to-wards each other; and
   interconnecting the coupling members, and wherein:
   in the method the coupling is performed by means of a device comprising first recesses for accommodating straight rods of a first width side positioned on opposite longitudinal ends of the clamping sheet and comprising second recesses for accommodating straights rods of a second width side positioned on opposite longitudinal ends of the clamping sheet, and which also comprises a support member distinct from the clamping sheet for carrying the device and the substrate and containing the recesses, and
   the method further comprises supporting the device via the support member.

10. The method according to claim 9, additionally comprising the steps of
   placing rods of a first width side that are positioned at opposite longitudinal ends of the clamping sheet near a bottom side of the substrate and placing rods of a second width side that are positioned at opposite longitudinal ends of the clamping sheet near a top side of the substrate;
   clamping the clamping sheet around at least a part of the circumference of the substrate; and
   mutually coupling rods of a same width side that are positioned at opposite longitudinal ends of the clamping sheet by means of the first and second, respectively, recesses in the device.

11. A method for transferring an image from a heat transfer sheet to a substrate, comprising the steps of performing the method according to claim 9 and placing the device and the substrate and the clamping sheet and the heat transfer sheet clamped around the substrate in a heating device, wherein the device supports on a bottom in the heating device.

12. The method according to claim 11, further comprising the additional step of disconnecting the coupling members and removing the clamping sheet and the heat transfer sheet from the substrate after heating the device and the substrate in the heating device for a predetermined time.

13. The method according to claim 9, further comprising the additional step of disconnecting the coupling members and removing the clamping sheet and the heat transfer sheet from the substrate after heating the device and the substrate in the heating device for a predetermined time.

* * * * *